C. H. HUDSON.
FISHING REEL.
APPLICATION FILED AUG. 2, 1916.
1,295,754. Patented Feb. 25, 1919.
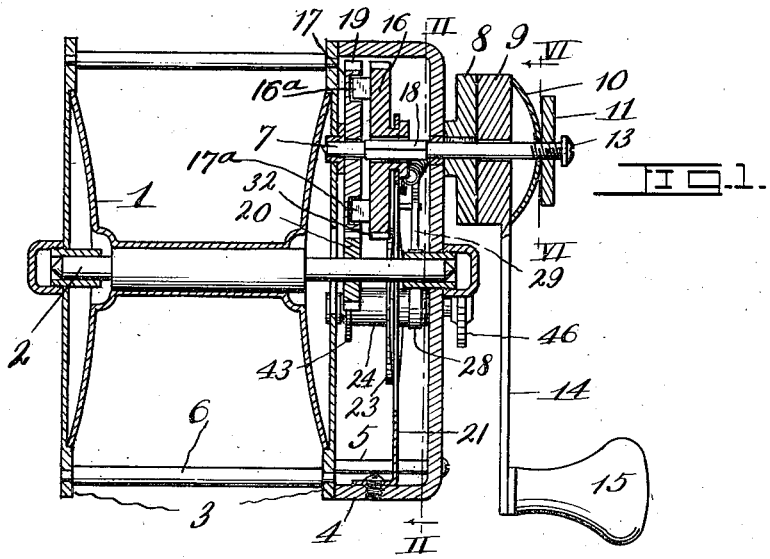
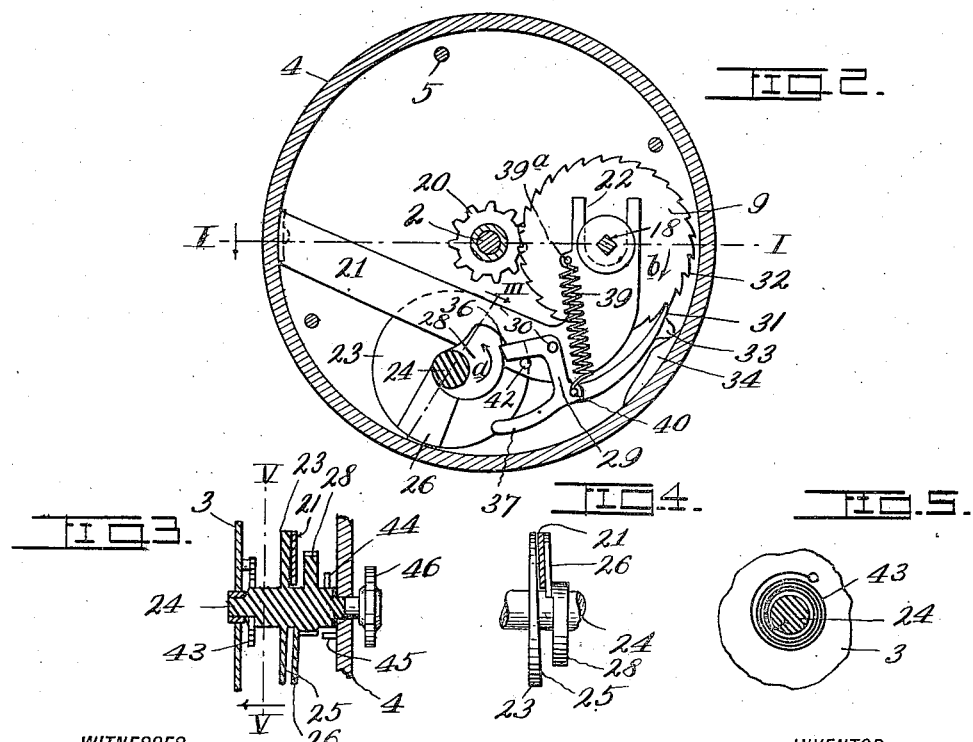
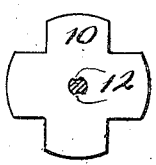
WITNESSES:
INVENTOR
Charles H. Hudson,
BY
F. G. Fischer,
ATTORNEY.

UNITED STATES PATENT OFFICE.

CHARLES H. HUDSON, OF KANSAS CITY, MISSOURI.

FISHING-REEL.

1,295,754.  Specification of Letters Patent.  Patented Feb. 25, 1919.

Application filed August 2, 1916. Serial No. 112,692.

*To all whom it may concern:*

Be it known that I, CHARLES H. HUDSON, a citizen of the United States, residing at Kansas City, in the county of Jackson and State of Missouri, have invented certain new and useful Improvements in Fishing-Reels, of which the following is a specification.

My invention relates to improvements in fishing reels and one object is to provide means whereby the reel spool may be manually thrown out of gear to permit it to rotate independently of its driving mechanism.

A further object is to provide means for automatically throwing the spool in gear, so that this operation need not be manually performed preparatory to winding a line upon said spool.

Other objects of the invention will hereinafter appear, and in order that said invention may be fully understood, reference will now be made to the accompanying drawings, in which:

Figure 1 is a horizontal sectional view of a reel embodying the invention, taken on line I—I of Fig. 2.

Fig. 2 is a cross section on line II—II of Fig. 1.

Fig. 3 is a broken section on line III of Fig. 2.

Fig. 4 is an elevation of certain parts disclosed by Fig. 3.

Fig. 5 is a cross section on line V—V of Fig. 3.

Fig. 6 is a cross section on line VI—VI of Fig. 1.

1 designates the reel spool, the shaft 2 of which is journaled at one end in one of a pair of side plates 3, and at its opposite end in a cup 4 fixed to the adjacent side plate 3 by suitable means such as transverse screws 5. The side plates 3 are united in the usual manner with cross bars 6.

7 designates a counter shaft journaled in the cup 4 and the adjacent side plate 3.

8 and 9 designate two disks of a friction brake, the former of which is fixedly mounted upon the counter shaft 7, while the latter is loosely mounted upon said counter shaft and held in frictional engagement with its companion by a spring 10, adapted to be tensioned to regulate the friction between the two disks 8 and 9 by a nut 11, threaded upon the outer end of the counter shaft.

The spring 10 is provided with oppositely disposed lugs 12 fitting into corresponding grooves in the counter shaft 7 in order to rotate therewith. A screw 13 threaded into the outer end of the counter shaft 7 serves as a stop in preventing the nut 11 from leaving the outer end of said counter shaft 7. The friction disk 9 is rotated through the intermediacy of a crank 14 fixed at one end to said disk and provided at its opposite end with a handle 15.

16 designates a clutch member provided with teeth 16ª adapted to drive a companion clutch member 17 loosely mounted upon the counter shaft 7 and provided with recesses 17ª to receive the teeth 16ª. The clutch member 16 is slidable upon the counter shaft 7 but made to rotate therewith through the intermediacy of the rectangular portion 18 of said counter shaft. The clutch member 17 has peripheral cog teeth 19 intermeshing with a pinion 20 fixed upon the spool shaft 2.

The clutch member 16 is normally held in engagement with the clutch member 17 by a spring 21 fixed at one end to the cup 4 and bifurcated at its opposite end 22 to straddle the flanged hub of the member 16, as disclosed by Figs. 1 and 2. Said spring 21 also serves to shift the clutch member 16 out of engagement with the clutch member 17, when forced laterally by the thick side of a large cam 23, fixed upon a shaft 24 and provided with an inclined surface 25 for engagement with the spring 21, as disclosed by Fig. 3.

26 designates a stop integral with the shaft 24 and arranged adjacent to the thin portion of the cam 23, so that when said thin portion is rotated into engagement with the spring 21 to allow the same to spring to the left and shift the clutch member 16 into engagement with the clutch member 17, said stop 26 engages the right side of the spring 21 and causes it to reliably hold the clutch member 16 in engagement with the clutch member 17.

28 designates a small cam integral with the shaft 24 and spaced a short distance from the large cam 23. The small cam 28 is adapted to coact with a lever 29, pivoted to the spring 21 at 30 and provided with a pivotally-mounted pawl 31 adapted to coact with peripheral ratchet teeth 32 on the clutch member 16, as will hereinafter appear. The free end of the pawl 31 is provided with a lug 33, adapted to ride on a guide 34 fixed to the interior of the cup 4, to hold the pawl 31 in engagement with the ratchet teeth 32 through a part of the movement thereof. The cam 28 is provided with a peripheral shoulder 36 for engagement with one end of the lever 37, as disclosed by Fig. 2.

39 designates a coil spring connected at one end to the spring 21 by a pin 39ª and at its opposite end to a pivot 40 connecting the bell crank 29 and the pawl 31. The spring 39 is so positioned that when the pivot 40 swings to either side of a line intersecting the pivot 30 and the pin 39ª, it will carry the bell-crank 29 through the remainder of its movement and cause it to either engage a stop 42, on the spring 21, or engage the cam 28, as the case may be.

43 designates a spiral spring encircling the shaft 24 to turn said shaft backward to normal position after it has been rotated to the position disclosed by Fig. 2. One end of said spring 43 is secured to the shaft 24 and its opposite end is secured to the adjacent side plate 3. Backward rotation of the shaft 24 is limited by a pin 44 projecting therefrom and adapted to contact a stop 45 fixed to the interior of the cup 4.

Briefly stated the operation is as follows: When it is desired to permit the spool 1 to rotate independently of the crank 14, as when casting, the knob 46 is turned in the direction of the arrow $a$, Fig. 2, about a half revolution to cause the thick portion of the large cam 23 to force the spring 21 to the right and cause it to shift the clutch member 16 out of engagement with the clutch member 17. As the shaft 24 is turned the high radius of the small cam 28 engages the arm 37 of the lever 29 and swings the same forward until the pivot 40 passes a line intersecting the pivot 30 and the pin 39ª, whereupon the spring 39 carries said lever 29 through the remainder of its forward movement, or until it contacts the stop pin 42. The forward movement of the lever 29 carries the pawl 31 into engagement with the ratchet teeth 32, so that the latter can force said pawl backward as will hereinafter appear. In the meantime the shaft 24 is turned in the direction of the arrow $a$ until the shoulder 36 of the cam 28 passes over the upper end of the lever 29, whereupon said cam is locked from being turned backward to normal position by the spiral spring 43.

The clutch remains out of gear until the handle 15 is turned in the direction of the arrow $b$, Fig. 2, which operation causes the ratchet teeth 32 to force the pawl 31 backward with the lever 29 until the pivot 40 passes a line intersecting the pivot 30 and the pin 39ª, whereupon said lever 29 is carried backward by the spring 39 until the arm 37 contacts the cam 28. As the lever 29 moves backward it swings out of engagement with the shoulder 36 and permits the spiral spring 43 to turn the shaft 24 backward until the pin 44 contacts the stop pin 45. As the shaft 24 turns backwardly it carries the cam 23 therewith, causing its thick portion to move out of engagement with the spring 21, so that the same can shift the clutch member 16 to the left and into engagement with the clutch member 17. When thus engaged the clutch member 16 is prevented from becoming accidentally disengaged from the clutch member 17 by the stop 26, which engages the right side of the spring 21, Fig. 4, and prevents the same from shifting to the right. Thus the clutch members will remain in positive engagement with each other irrespective of the direction in which the crank 14 is rotated.

From the foregoing it will be understood that while the clutch members 16 and 17 are manually thrown out of gear to allow the spool 1 to turn freely, said clutch members are automatically thrown into gear to positively drive the spool 1 to wind the fishing line thereon when the handle 15 is rotated in the direction of the arrow $b$.

The friction members 8 and 9 may be adjusted to offer resistance according to the strength of the fishing line. Thus a large fish is prevented from breaking the line as the latter is free to pay out when a sufficient pull is exerted thereon to cause the friction members 8 and 9 to slip on each other.

While I have shown and described the preferred form of my invention, I reserve the right to make such changes in the construction, proportion, and arrangement of parts as properly fall within the spirit and scope of the claims.

Having thus described my invention, what I claim and desire to secure by Letters Patent, is:

1. In a device of the character described, a spool, driving mechanism for said spool, a resilient member to throw said driving mechanism in and out of gear, manual means for adjusting said resilient member to throw the driving mechanism out of gear, and means controlled by the driving mechanism for restoring the manual means to normal position to allow the resilient member to throw the driving mechanism in gear.

2. In a device of the character described, a spool, driving means for said spool, rotary means for throwing said driving means out of gear to allow the spool to rotate freely in one direction, a lever to lock said rotary means after the same has thrown the driving means out of gear, and automatic means for throwing said rotary means to normal position and the driving means in gear preparatory to rotating the spool in a reverse direction.

3. In a device of the character described, a spool, a counter shaft, intermeshing gear wheels on the spool shaft and the counter shaft, a clutch member on the counter shaft adapted to engage and rotate the gear wheel on said counter shaft, a spring for shifting said clutch member in and out of gear, a rotary cam for controlling said spring, a spiral spring to restore said rotary cam to normal position, a small cam to lock said rotary cam from returning to normal position, a latch coacting with said small cam to lock the rotary cam from returning to normal position, a pawl for disengaging said latch from the small cam, ratchet teeth on the clutch member for actuating said latch, a spring coacting with said ratchet teeth for actuating said latch, and a crank for rotating the counter shaft.

4. In a device of the character described, a spool, driving means for said spool including a handle, manual means operable independently of said handle for throwing the driving means out of gear to allow the spool to rotate freely in one direction, and automatic means for throwing the driving means in gear when the handle is rotated to drive the spool in a reverse direction.

5. In a device of the character described, a spool, means including a handle for positively driving said spool in either direction, manual means operable independently of said handle for throwing the driving means out of gear to allow the spool to rotate freely in one direction, and automatic means for throwing the driving means in gear when the handle is rotated to drive the spool in a reverse direction.

In testimony whereof I affix my signature in the presence of two witnesses.

CHARLES H. HUDSON.

Witnesses:
F. G. FISCHER,
L. J. FISCHER.